(12) United States Patent
Russegger et al.

(10) Patent No.: US 10,236,103 B2
(45) Date of Patent: Mar. 19, 2019

(54) MOISTURE RESISTANT LAYERED SLEEVE HEATER AND METHOD OF MANUFACTURE THEREOF

(71) Applicant: Watlow Electric Manufacturing Company, St. Louis, MO (US)

(72) Inventors: Elias Russegger, Golling (AT); Gerhard Schefbanker, Golling (AT); Gernot Antosch, Golling (AT); Wolfgang Poeschl, Golling (AT); Martin Wallinger, Golling (AT); Kevin Ptasienski, O'Fallon, MO (US); Matt Kenchel, Wentzville, MO (US); Kenneth Fennewald, Maryland Heights, MO (US); Allen Boldt, Kirkwood, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 691 days.

(21) Appl. No.: 13/762,871

(22) Filed: Feb. 8, 2013

(65) Prior Publication Data
US 2013/0146584 A1    Jun. 13, 2013

Related U.S. Application Data

(62) Division of application No. 12/270,773, filed on Nov. 13, 2008, now Pat. No. 8,395,092.
(Continued)

(51) Int. Cl.
*H05B 3/46*    (2006.01)
*H01C 17/00*   (2006.01)
(Continued)

(52) U.S. Cl.
CPC ......... *H01C 17/00* (2013.01); *B29C 45/2737* (2013.01); *H05B 3/04* (2013.01);
(Continued)

(58) Field of Classification Search
CPC ........ H01C 17/00; B29C 45/2737; H05B 3/04
(Continued)

(56) References Cited

U.S. PATENT DOCUMENTS

| 4,545,339 A | 10/1985 | Brooks et al. |
| 4,620,511 A | 11/1986 | Brooks et al. |

(Continued)

FOREIGN PATENT DOCUMENTS

| WO | 1996/00143  | 1/1996 |
| WO | 2003/078123 | 9/2003 |
| WO | 2005/053361 | 6/2005 |
| WO | 2007/036018 | 4/2007 |

OTHER PUBLICATIONS

International Search Report of PCT/US2008/083376.

*Primary Examiner* — Tu B Hoang
*Assistant Examiner* — Thomas Ward
(74) *Attorney, Agent, or Firm* — Buris Law, PLLC

(57) ABSTRACT

A heater assembly is provided that includes a substrate having opposed end portions defining raised flanges, a slot extending between the opposed end portions, and opposed chamfered surfaces extending along the slot and across the raised flanges. A plurality of layers are disposed onto the substrate, along with a pair of terminal pads. A protective cover defining at least one aperture is disposed over the layers and is secured to the raised flanges and the opposed chamfered surfaces of the substrate, and the aperture is disposed proximate the terminal pads. A pair of lead wires is secured to the pair of terminal pads, and a lead cap assembly is disposed around the pair of lead wires and is secured to the protective cover.

20 Claims, 18 Drawing Sheets

Related U.S. Application Data

(60) Provisional application No. 60/988,712, filed on Nov. 16, 2007.

(51) Int. Cl.
    *B29C 45/27*     (2006.01)
    *H05B 3/58*     (2006.01)
    *H05B 3/04*     (2006.01)

(52) U.S. Cl.
    CPC ............... *H05B 3/46* (2013.01); *H05B 3/58* (2013.01); *Y10T 29/49083* (2015.01); *Y10T 29/49169* (2015.01)

(58) Field of Classification Search
    USPC ............... 219/260–270, 123; 123/143 A, 123/143 R–143 C
    See application file for complete search history.

(56) References Cited

U.S. PATENT DOCUMENTS

| | | | |
|---|---|---|---|
| 4,620,512 A | 11/1986 | Brooks et al. | |
| 5,877,411 A * | 3/1999 | Namerikawa et al. | 73/64.53 |
| 8,022,339 B2 * | 9/2011 | Schlipf | 219/535 |
| 2003/0218006 A1 * | 11/2003 | Sutorius | 219/535 |
| 2007/0086759 A1 | 4/2007 | Russegger et al. | |
| 2007/0278213 A2 * | 12/2007 | McMillin et al. | 219/543 |
| 2009/0127244 A1 | 5/2009 | Russegger et al. | |
| 2009/0236327 A1 | 9/2009 | Everly et al. | |
| 2009/0297132 A1 | 12/2009 | Abbott | |

\* cited by examiner

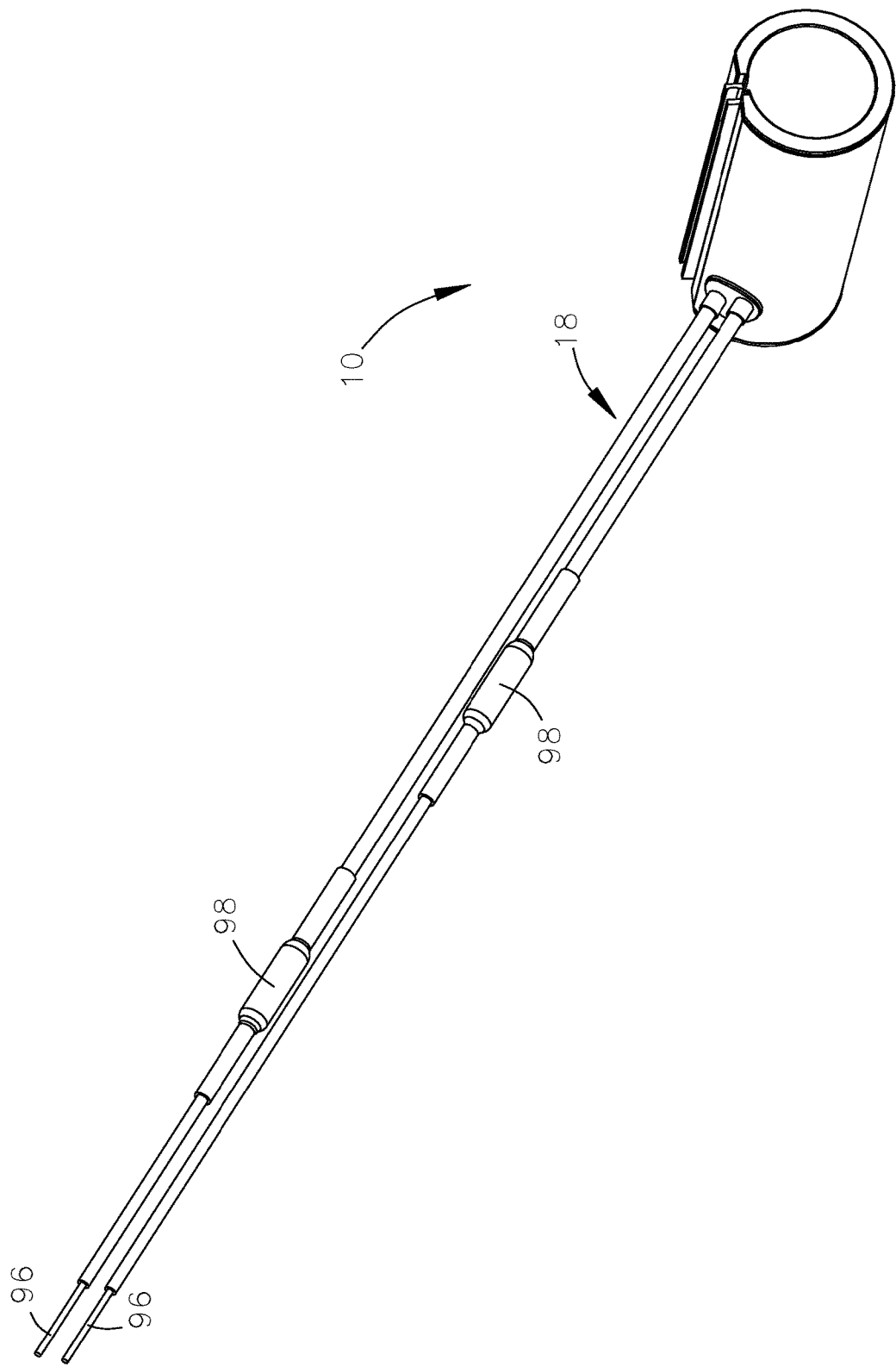

MOISTURE RESISTANT LAYERED SLEEVE HEATER AND METHOD OF MANUFACTURE THEREOF

CROSS-REFERENCE TO RELATED APPLICATIONS

This application is a divisional of U.S. patent application Ser. No. 12/270,773, filed on Nov. 13, 2008, which claims the benefit of provisional application Ser. No. 60/988,712, filed on Nov. 16, 2007. The contents of these applications are incorporated herein by reference in their entirety.

FIELD

The present disclosure relates to resistance heaters, such as layered heaters by way of example, and more particularly to an apparatus and method for reducing moisture intrusion into such resistance heaters.

BACKGROUND

The statements in this section merely provide background information related to the present disclosure and may not constitute prior art.

Layered heaters are typically used in applications where space is limited, when heat output needs vary across a surface, where rapid thermal response is desirous, or in ultra-clean applications where moisture or other contaminants can migrate into conventional heaters. A layered heater generally comprises layers of different materials, namely, a dielectric and a resistive material, which are applied to a substrate. The dielectric material is applied first to the substrate and provides electrical isolation between the substrate and the electrically-live resistive material and also reduces current leakage to ground during operation. The resistive material is applied to the dielectric material in a predetermined pattern and provides a resistive heater circuit. The layered heater also includes leads that connect the resistive heater circuit to an electrical power source, which is typically cycled by a temperature controller. The lead-to-resistive circuit interface is also typically protected both mechanically and electrically from extraneous contact by providing strain relief and electrical isolation through a protective layer. Accordingly, layered heaters are highly customizable for a variety of heating applications.

Layered heaters may be "thick" film, "thin" film, or "thermally sprayed," among others, wherein the primary difference between these types of layered heaters is the method in which the layers are formed. For example, the layers for thick film heaters are typically formed using processes such as screen printing, decal application, or film dispensing heads, among others. The layers for thin film heaters are typically formed using deposition processes such as ion plating, sputtering, chemical vapor deposition (CVD), and physical vapor deposition (PVD), among others. Yet another series of processes distinct from thin and thick film techniques are those known as thermal spraying processes, which may include by way of example flame spraying, plasma spraying, wire arc spraying, and HVOF (High Velocity Oxygen Fuel), among others.

Thermally sprayed layered heaters are generally formed by spraying molten powder or wire feedstock onto a substrate in the requisite layers as set forth above. The molten material impacts the substrate, or layers that have previously been applied over the substrate, resulting in lenticular or lamellar grain structure from the rapid solidification of small globules, flattened from striking a cooler surface at relatively high velocities. Due to this resultant grain structure, a common characteristic of thermally sprayed heaters is porosity, which can be beneficial in terms of fracture toughness, but also detrimental in terms of moisture absorption. In heater applications, if the thermally sprayed layers absorb an excessive amount of moisture, this moisture can cause the heater to fail during operation by mechanisms such as delaminating the individual layers or interrupting the supply of electrical power, or enabling excessive leakage current to ground.

Moisture absorption is also an issue in many other types of resistance heaters, and thus improved devices and methods to counteract the adverse affects of moisture on heater performance are continually appreciated in the field of resistance heaters.

SUMMARY

In one form, a heater assembly is provided that includes a substrate, a first dielectric layer disposed over the substrate, a resistive element layer disposed over the first dielectric layer, a pair of terminal pads disposed over the first dielectric layer and in contact with the resistive element layer, and a second dielectric layer disposed over the resistive element layer and not completely over the terminal pads. The heater assembly further includes a protective cover defining at least one aperture. The protective cover is disposed over the second dielectric layer and secured to the substrate. The aperture is disposed proximate the terminal pads. A pair of lead wires are secured to the pair of terminal pads. A lead cap assembly is disposed around the pair of lead wires and secured to the protective cover. The protective cover and the lead cap assembly are secured such that the layers are protected from moisture intrusion.

In another form, a heater assembly is provided that includes a substrate, a plurality of layers thermally sprayed onto the substrate, and a protective cover secured to the substrate. The protective cover is secured such that the thermally sprayed layers are protected from moisture intrusion.

In still another form, a heater assembly includes a substrate defining an outer surface and a recessed area recessed from the outer surface, a plurality of layers thermally sprayed onto the substrate, and a protective cover secured to the substrate to protect the plurality of thermally sprayed layers against moisture intrusion. The plurality of layers include a resistive layer and a pair of terminal pads on the resistive layer. The terminal pads are disposed in the recessed area. A space is defined between the protective cover and the recessed area of the substrate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 12a is a perspective view of the heater assembly and a set of secondary lead wires constructed in accordance with the principles of the present disclosure;

DETAILED DESCRIPTION

Figure 1:
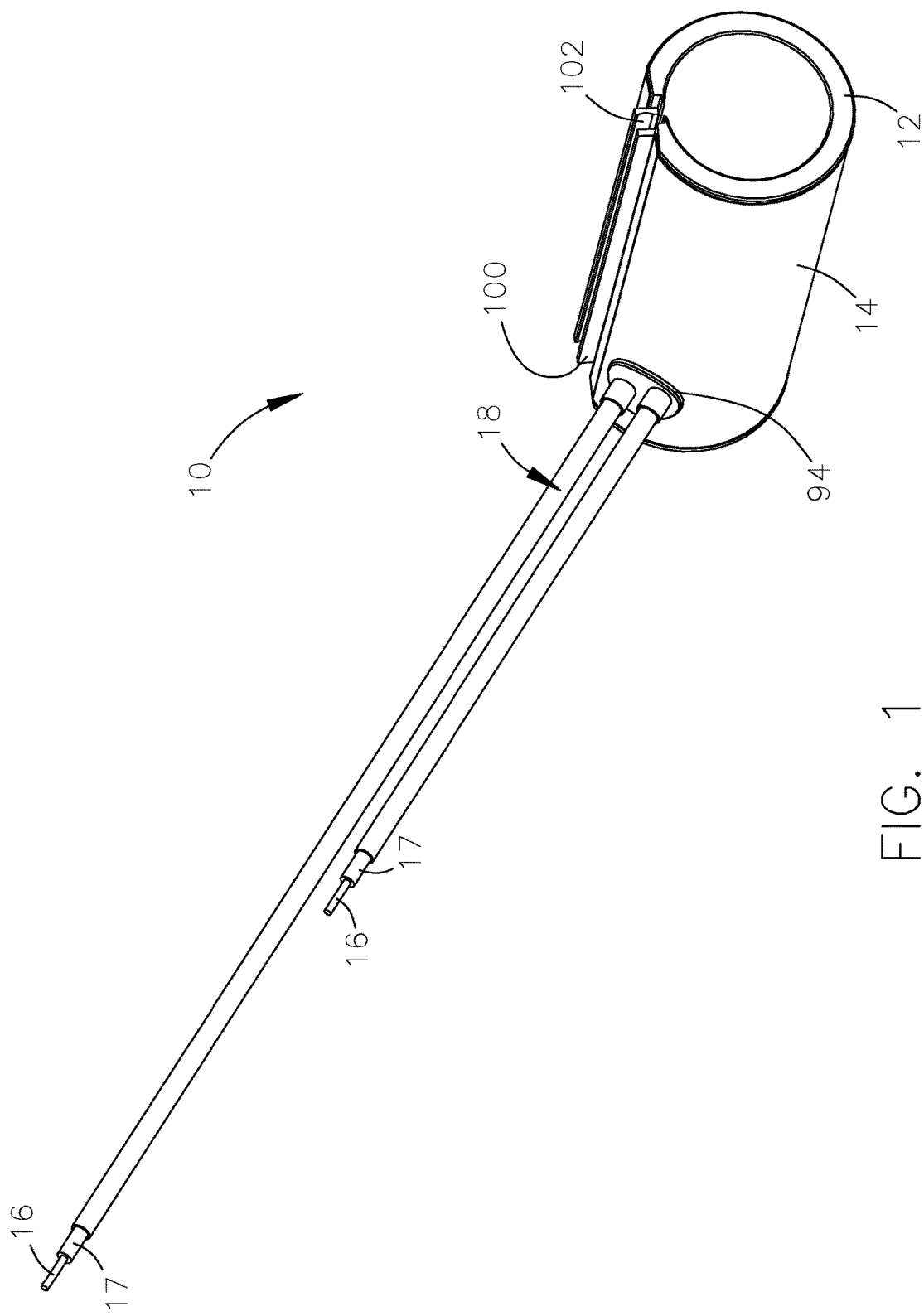
FIG. 1 is a perspective view of a heater assembly constructed in accordance with the principles of the present disclosure.

The following description is merely exemplary in nature and is not intended to limit the present disclosure, application, or uses. It should be understood that throughout the drawings, corresponding reference numerals indicate like or corresponding parts and features.

Referring to FIGS. 1-4, a heater assembly in accordance with the principles of the present disclosure is illustrated and generally indicated by reference numeral 10. In one form, the heater assembly comprises a substrate 12, a plurality of layers (not shown) disposed on the substrate that will be described in greater detail below, a protective cover 14 disposed over the layers and secured to the substrate 12, a pair of lead wires 16 (surrounded by insulation 17) secured to the heater assembly 10, and a lead cap assembly 18 disposed around the pair of lead wires 16 and secured to the protective cover 14. The heater assembly 10 is adapted for use around a target object to be heated such as a hot runner nozzle (not shown) by way of example, hence the geometrical configuration of a cylinder as shown. It should be understood that the heater assembly 10 may take other geometrical configurations such as flat, rectangular, or other polygonal shapes while remaining within the scope of the present disclosure. Additionally, although a layered heater construction is employed with the heater assembly 10 as illustrated and described herein, it should be understood that other types of heaters, such as resistive wire, resistive foil, or compacted ceramic, by way of example, may be employed while remaining within the scope of the present disclosure.

Figure 3:
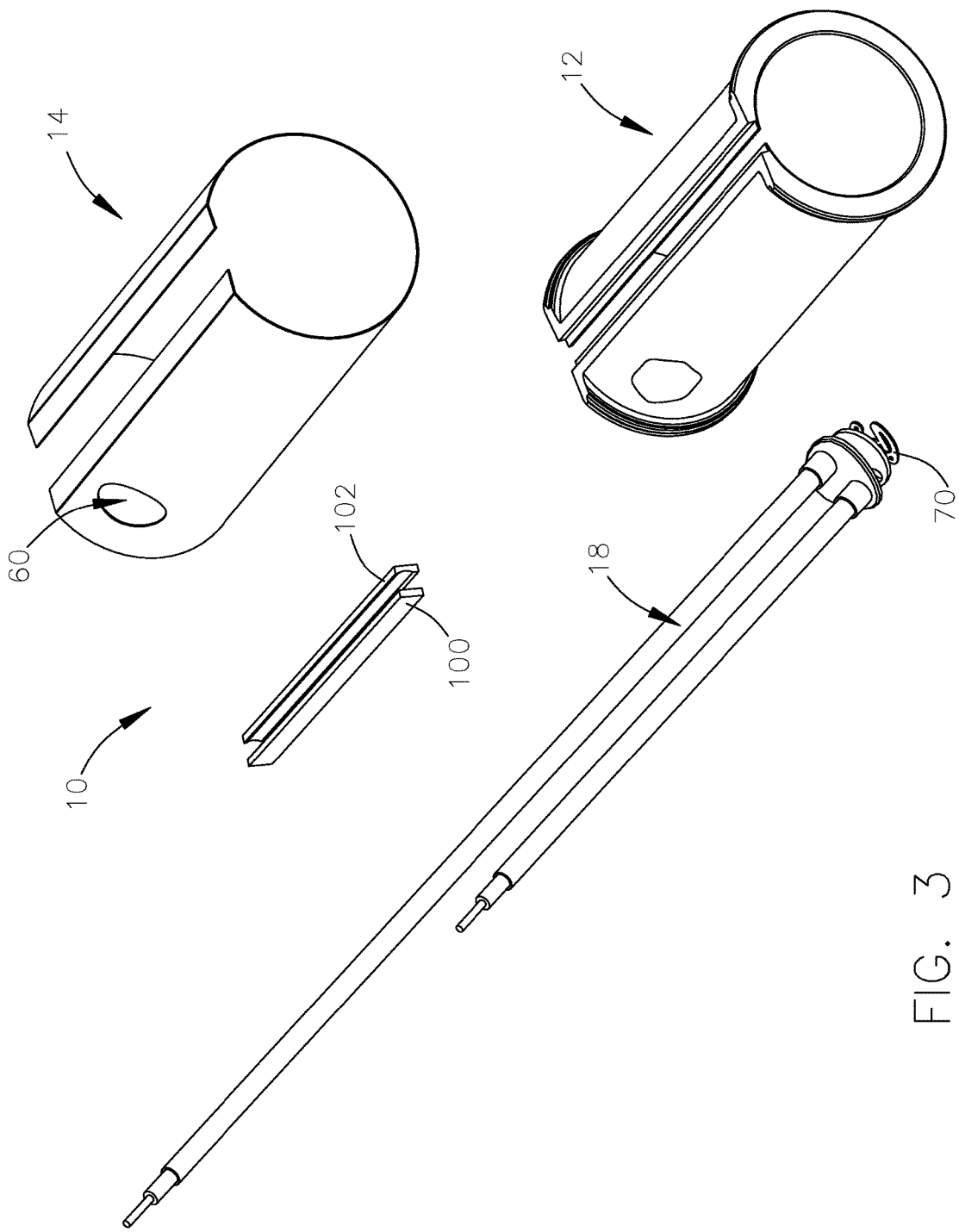
FIG. 3 is an exploded perspective view of the heater assembly in accordance with the principles of the present disclosure.
Figure 8:
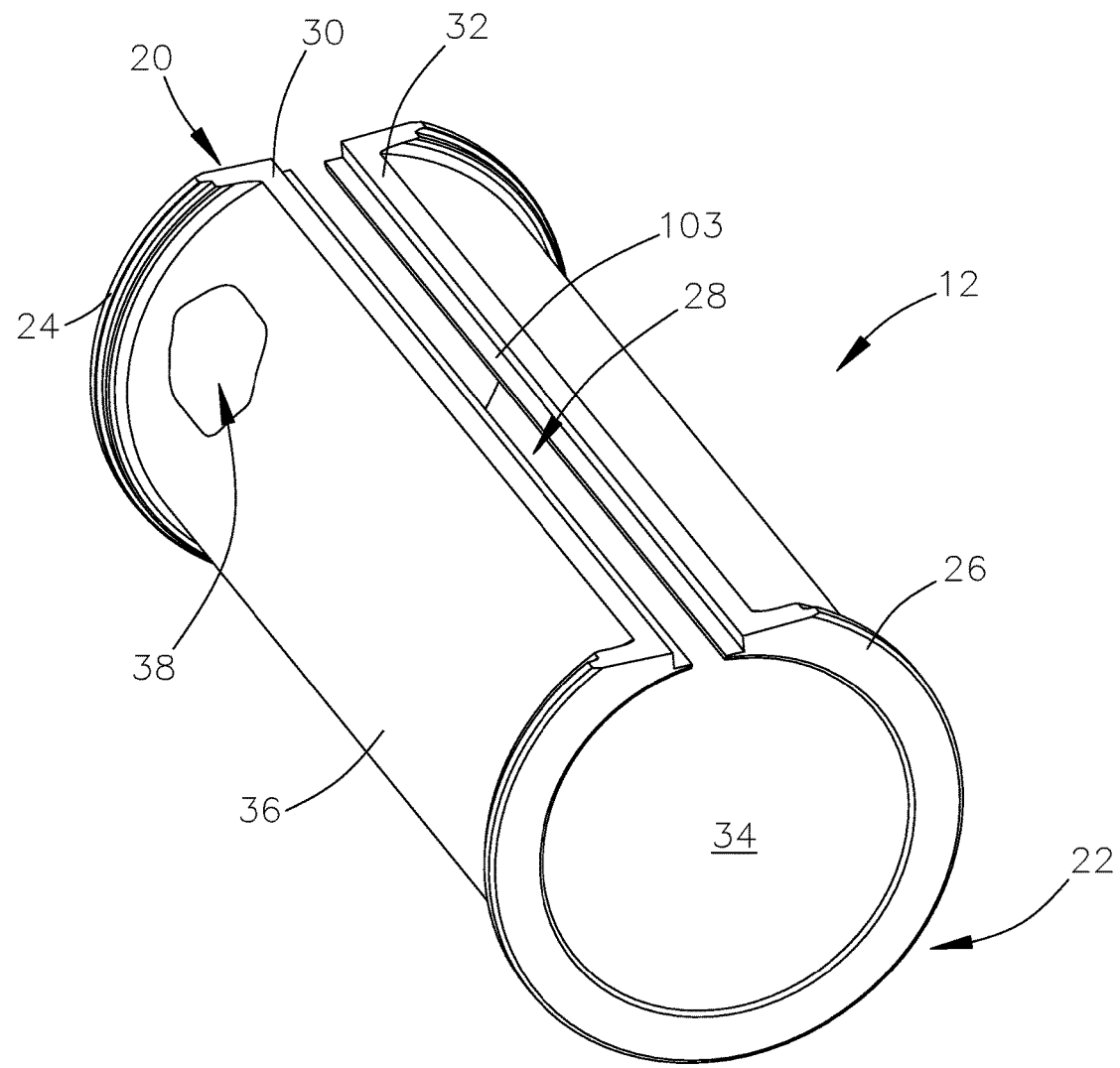
FIG. 8 is a perspective view of a substrate constructed in accordance with the principles of the present disclosure.
Figure 9:
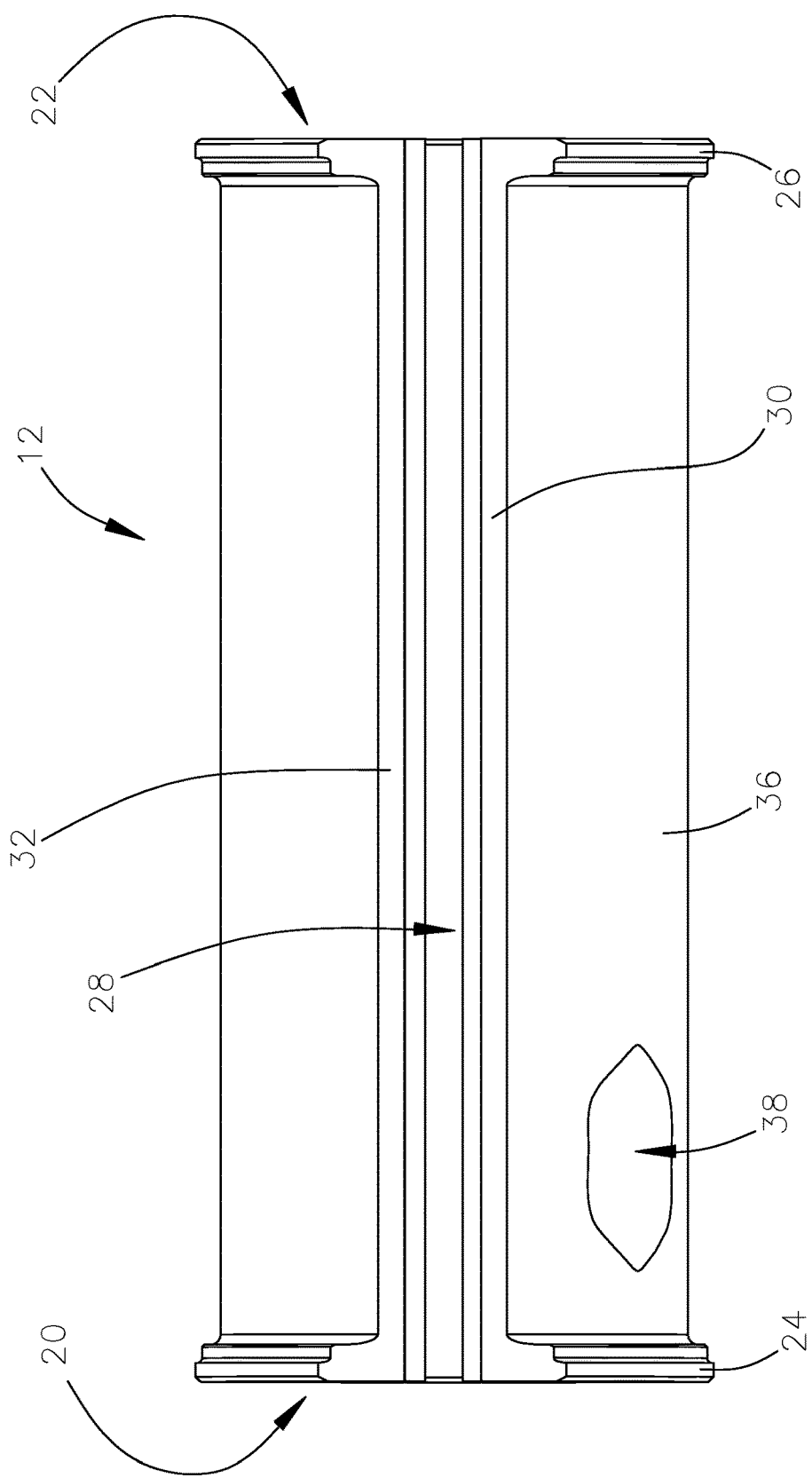
FIG. 9 is a top view of the substrate in accordance with the principles of the present disclosure.

As shown in FIG. 3 and more particularly in FIGS. 8 and 9, one form of the substrate 12 is illustrated and now described in greater detail. In this form, the substrate 12 comprises opposed end portions 20 and 22 that define raised flanges 24 and 26, respectively. A slot 28 extends between the opposed end portions 20 and 22, and opposed chamfered surfaces 30 and 32 extend along the slot 28 and across the raised flanges 24 and 26. The substrate 12 defines a cylindrical configuration as shown and includes an internal bore 34 that is adapted for placement around a heating target such as a hot runner nozzle, by way of example. An outer surface 36 extends between the raised flanges 24 and 26, and a recess 38 is disposed on the outer surface 36. The recess 38 accommodates a termination area as described in greater detail below. The substrate 12 in one form is a stainless steel material, however, it should be understood that a variety of materials may be employed while remaining within the scope of the present disclosure.

Figure 4:
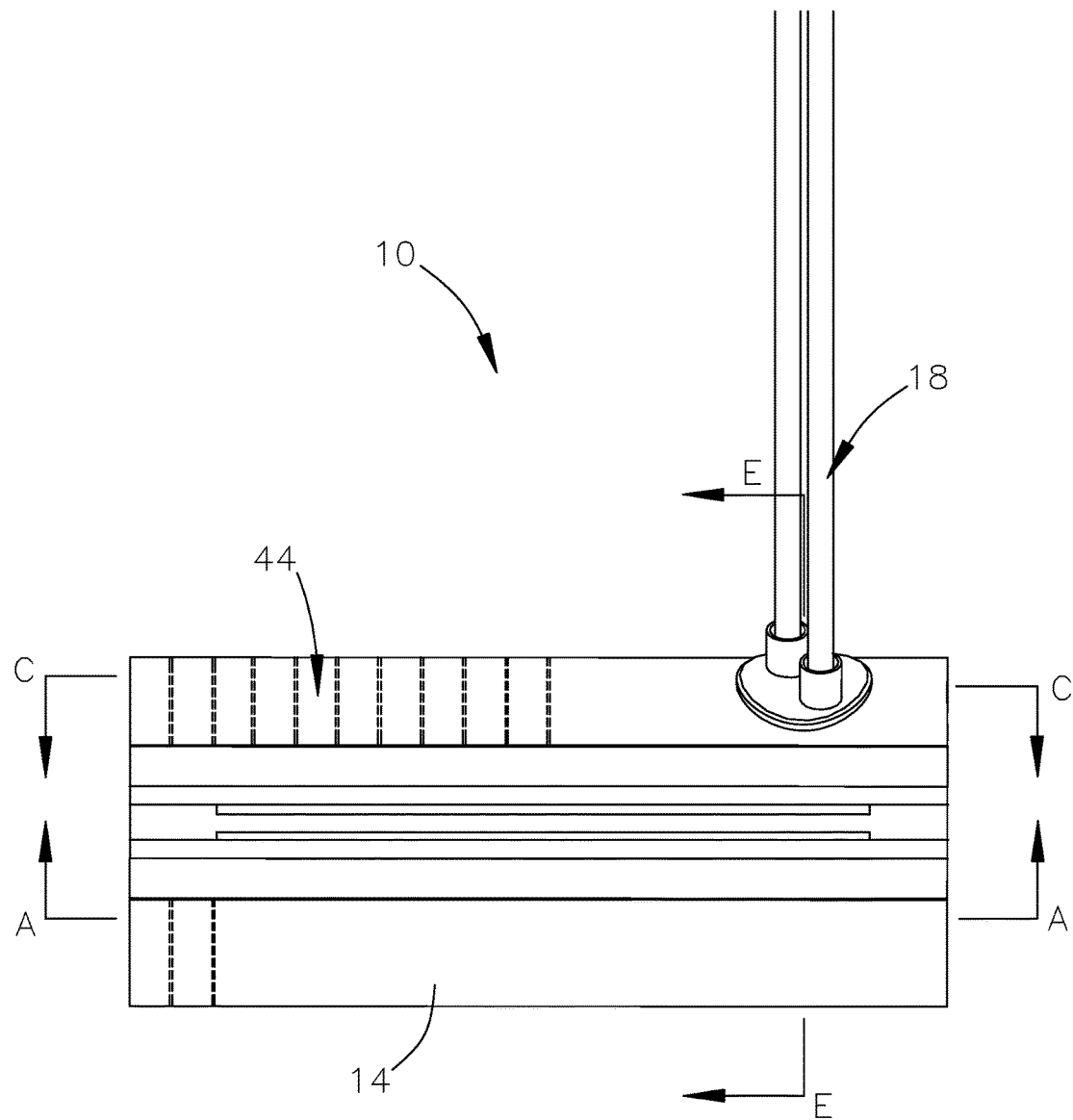
FIG. 4 is a top view of the heater assembly in accordance with the principles of the present disclosure.
Figure 5A:
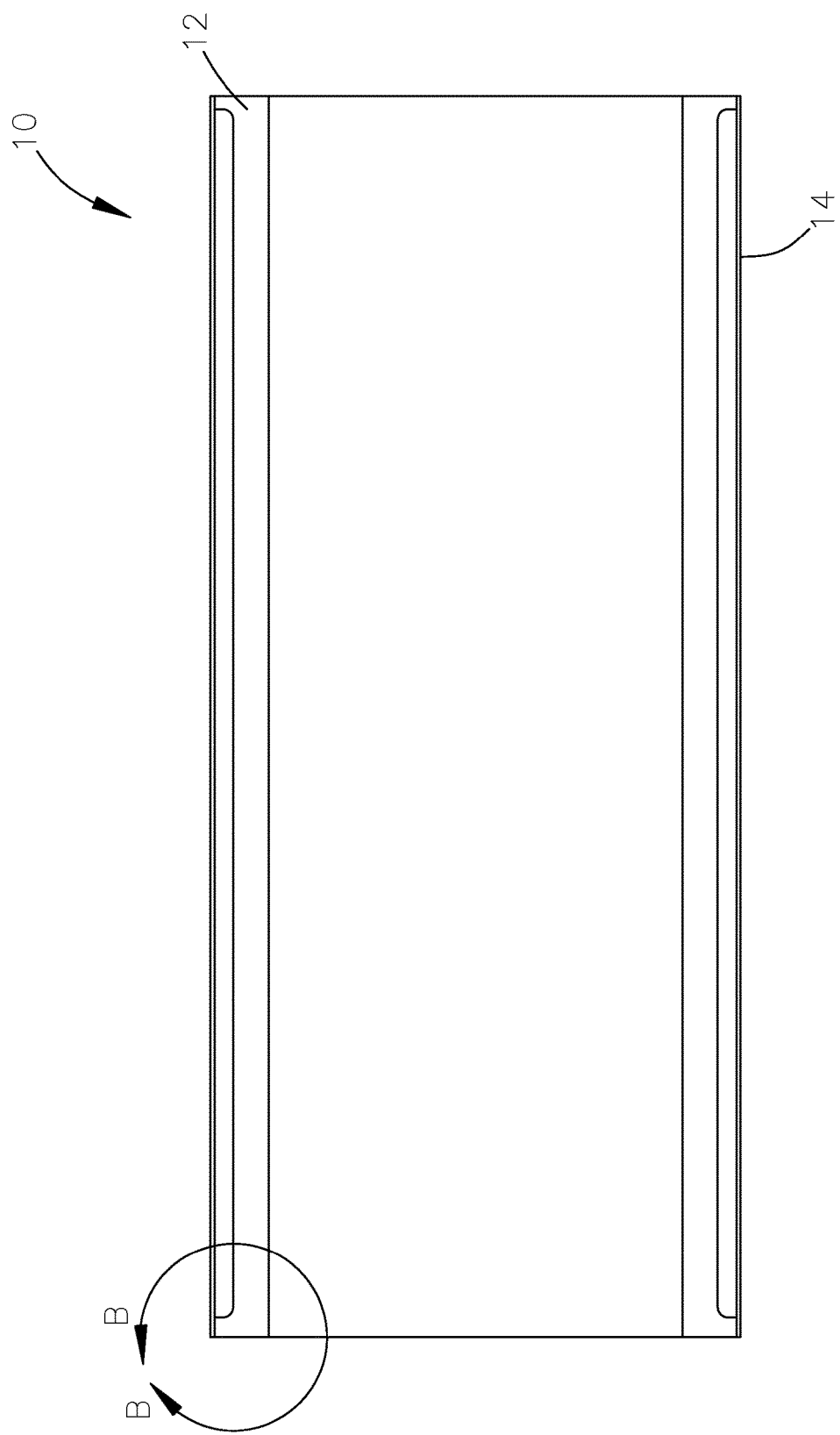
FIG. 5a is a longitudinal cross-sectional view, taken along line A-A of FIG. 4, illustrating an internal construction of the heater assembly in accordance with the principles of the present disclosure.
Figure 5B:
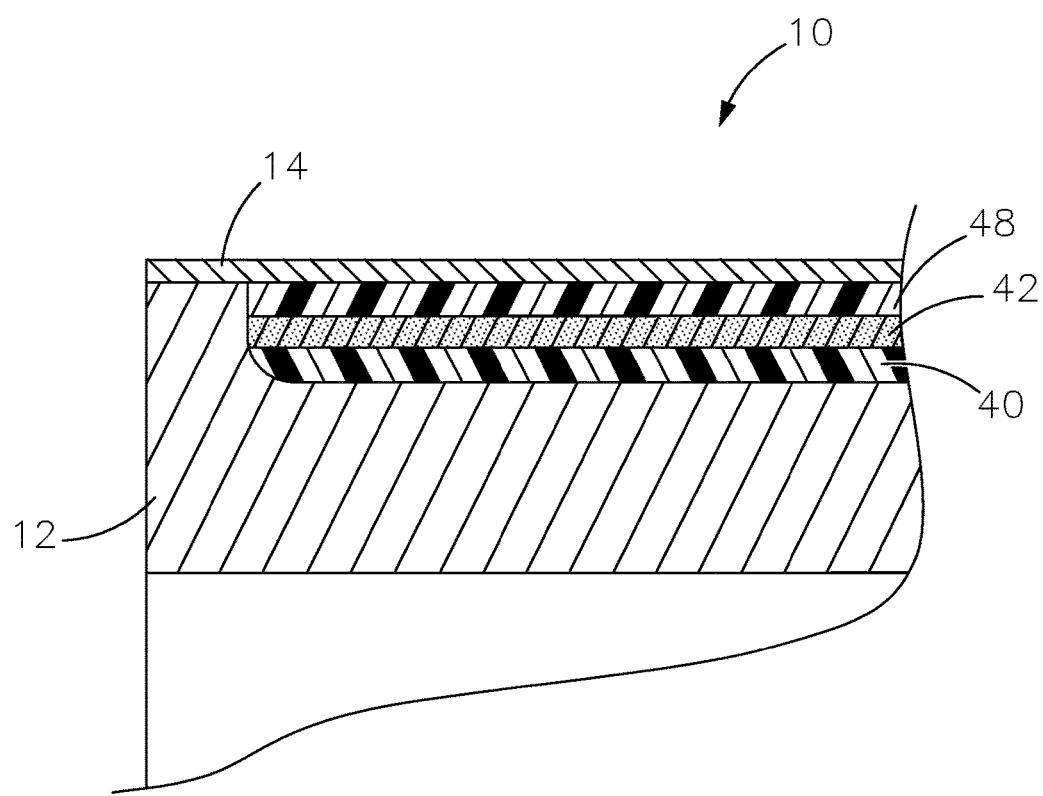
FIG. 5b is a detail view, within view B-B of FIG. 5a, illustrating various layers of the heater assembly and constructed in accordance with the principles of the present disclosure.

Referring now to FIGS. 4-6, the plurality of layers are illustrated and now described in greater detail. The layers include, by way of example, a first dielectric layer 40 disposed over the substrate 12 and in one form extending between the raised flanges 24 and 26 and proximate the chamfered surfaces 30 and 32 of the substrate 12. The first dielectric layer 40 is also formed over the recess 38 on the substrate 12, and as such, takes on the form of the recess 38 as shown. In one form, the first dielectric layer 40 is formed using a thermal spraying process and is generally a constant thickness. It should be understood that other processes and configurations (e.g., variable thickness and/or materials, among others) for the first dielectric layer 40 may be employed while remaining within the scope of the present disclosure.

A resistive element layer 42 is disposed over the first dielectric layer 40 and may take on the form of a resistive circuit 44 (shown dashed in FIG. 4) or may alternately be a continuous layer. In one form, the resistive element layer 42 is formed using a thermal spraying process and is generally a constant thickness. The pattern for the resistive circuit 44 may be formed by any number of methods and in one form is created by using a laser removal process such as that disclosed in copending U.S. application Ser. No. 10/872,752 titled "Method For the Production of an Electrically Conductive Resistive Layer and Heating and/or Cooling Device," filed on Jun. 21, 2004, which is commonly assigned with the present application and the contents of which are incorporated herein by reference in their entirety. It should be understood that other processes and configurations (e.g., variable thickness and/or materials, among others) for the resistive element layer 42 may be employed while remaining within the scope of the present disclosure. Additionally, the resistive element layer 42 is also formed over the recess 38 on the substrate 12, and along with the first dielectric layer 40, takes on the form of the recess 38 as shown.

A pair of terminal pads 46 are disposed over the first dielectric layer 40 and are in contact with the resistive element layer 42 as shown. The terminal pads 46 are adapted for connecting the lead wires 16, which is described in greater detail below, for the application of electrical power to the heater assembly 10. In one form, the terminal pads 46 are created by a thermal spraying process, however, it should be understood that other processes may be employed while remaining within the scope of the present disclosure.

A second dielectric layer 48 is disposed over the resistive element layer 42 for thermal and electrical isolation. As shown, the second dielectric layer 48 is not disposed completely over the terminal pads 46 so that at least a portion of the terminal pads 46 remain exposed for connection to the lead wires 16. More specifically, and as best shown in FIG. 6b, the second dielectric layer 48 terminates around the recess 38 as shown such that the terminal pads 46 are exposed to the lead wires 16 for the electrical connection. In one form, the second dielectric layer 48 is created by a thermal spraying process and is generally a constant thickness. It should be understood that other processes and configurations (e.g., variable thickness and/or materials, among others) for the second dielectric layer 48 may be employed while remaining within the scope of the present disclosure.

While each of the dielectric layer 40, resistive element layer 42, terminal pads 46, and second dielectric layer 48 are formed using a thermal spraying process, it should be understood that one or more of these layers may be formed by any number of processes, including, by way of example, those disclosed in copending U.S. application Ser. No. 10/752,359, titled "Combined Material Layering Technologies," filed on Jan. 6, 2004, which is commonly assigned with the present application and the contents of which are incorporated herein by reference in their entirety.

Figure 10:
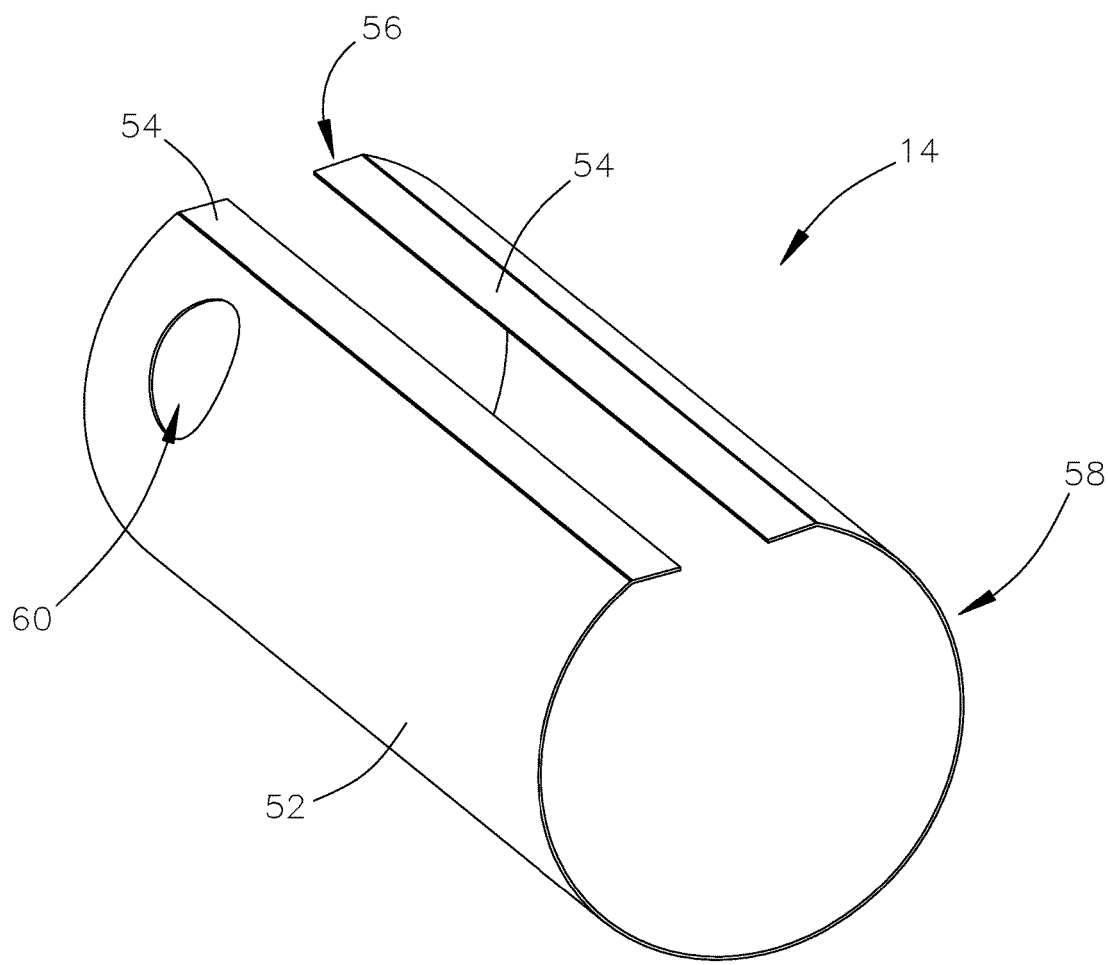
FIG. 10 is a perspective view of a protective cover constructed in accordance with the principles of the present disclosure.
Figure 11:
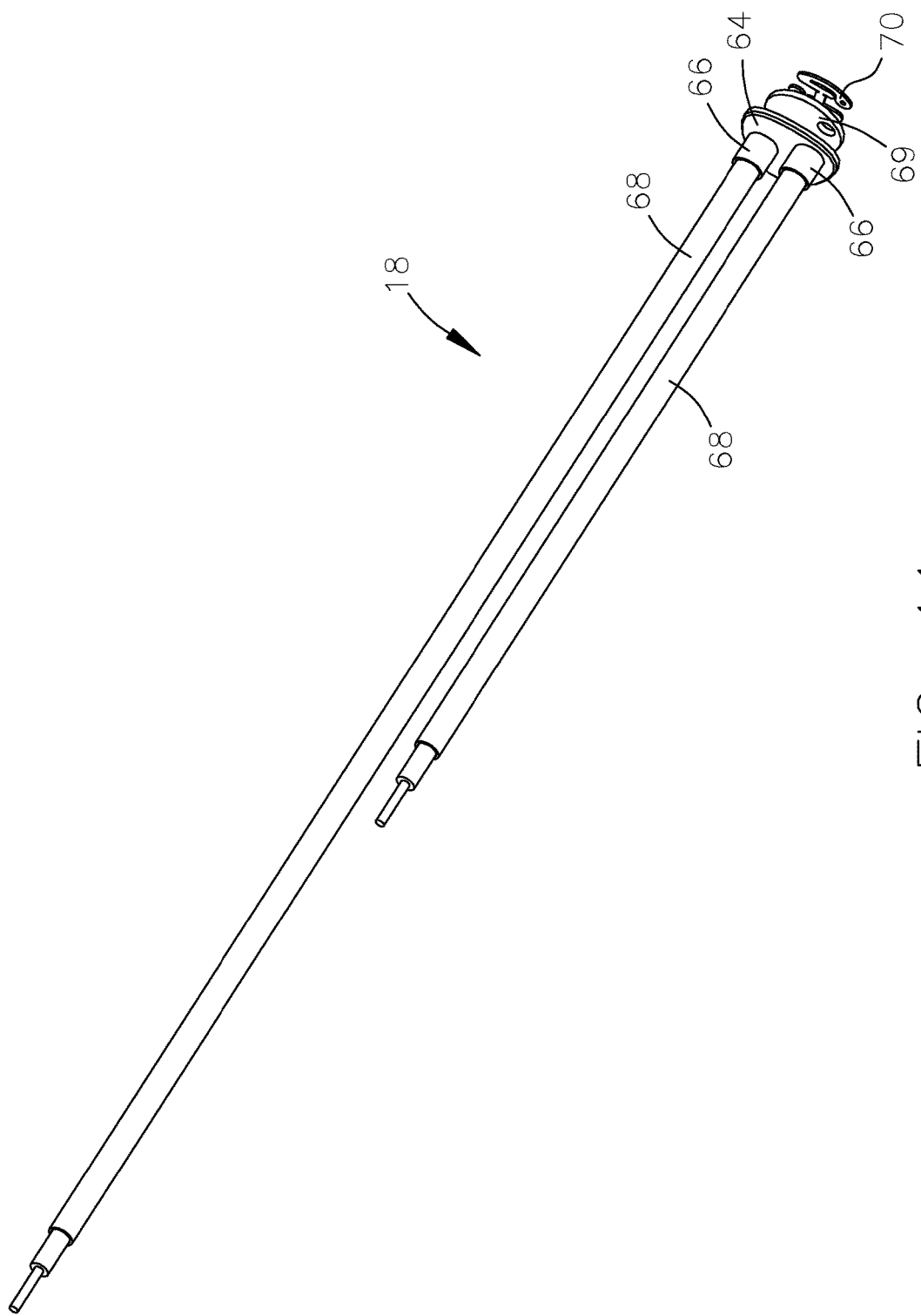
FIG. 11 is a perspective view of a lead cap assembly constructed in accordance with the principles of the present disclosure.

Referring now to FIGS. 1-10, the protective cover 14 is disposed over the second dielectric layer 48 and is secured to the raised flanges 24 and 26 and the opposed chamfered surfaces 30 and 32. As shown in FIG. 10, the protective cover 14 in one form defines a cylindrical preform having a curved outer wall 52 and longitudinal flats 54 extending between end portions 56 and 58. In one form, the protective cover 14 is a constant thickness foil material and is laser welded circumferentially around the raised flanges 24 and 26 of the substrate 12 and also laser welded longitudinally to the chamfered surfaces 30 and 32 along the slot 28 of the substrate 12. More specifically, the end portions 56 and 58 are laser welded to the raised flanges 24 and 26, and the longitudinal flats 54 are laser welded to the chamfered surfaces 30 and 32. Accordingly, the layers disposed within the heater assembly 10 are protected from the outside environment, and more particularly from moisture intrusion, in part by the protective cover 14.

Figure 2:
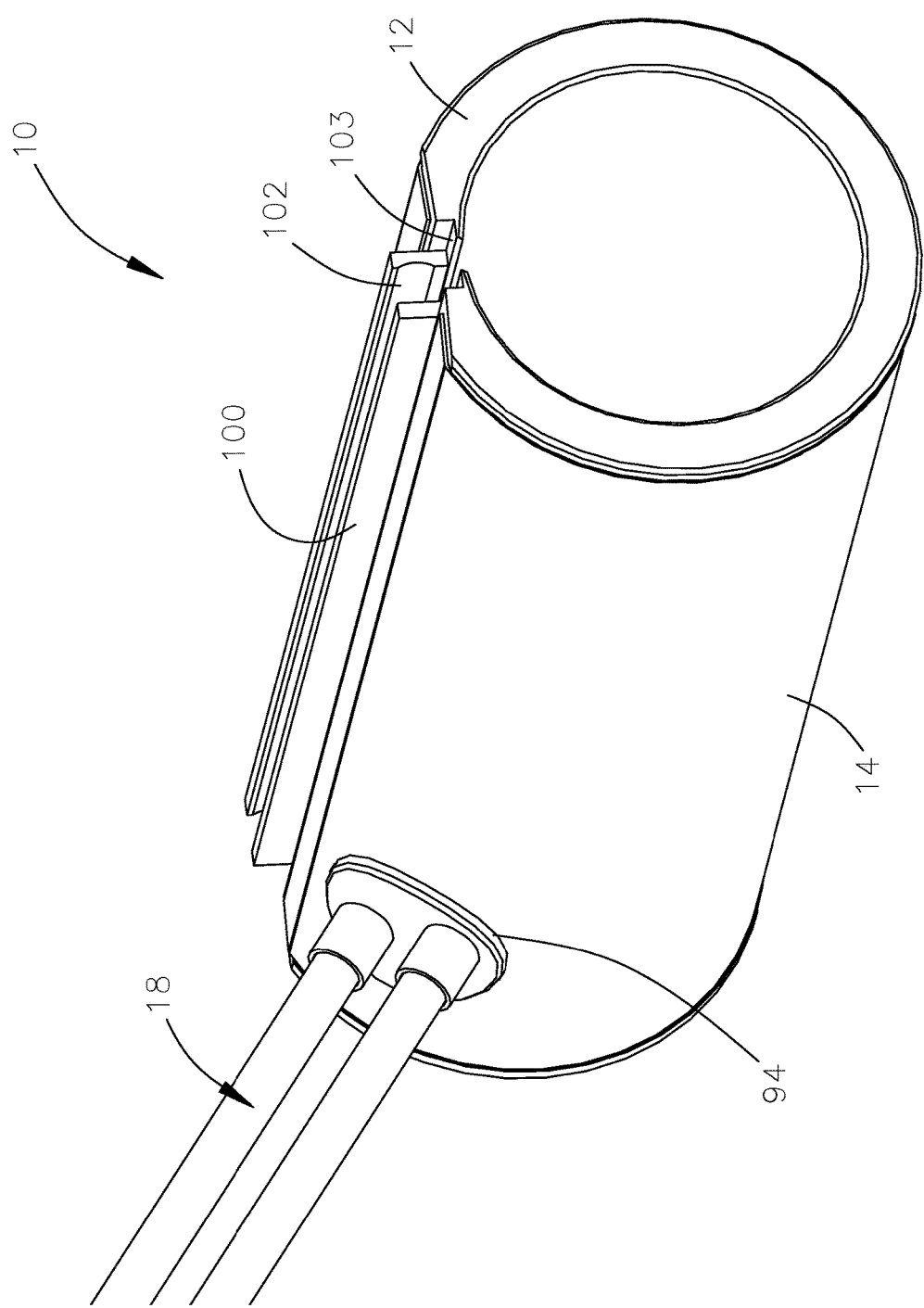
FIG. 2 is an enlarged perspective view of the heater assembly in accordance with the principles of the present disclosure.
Figure 6A:
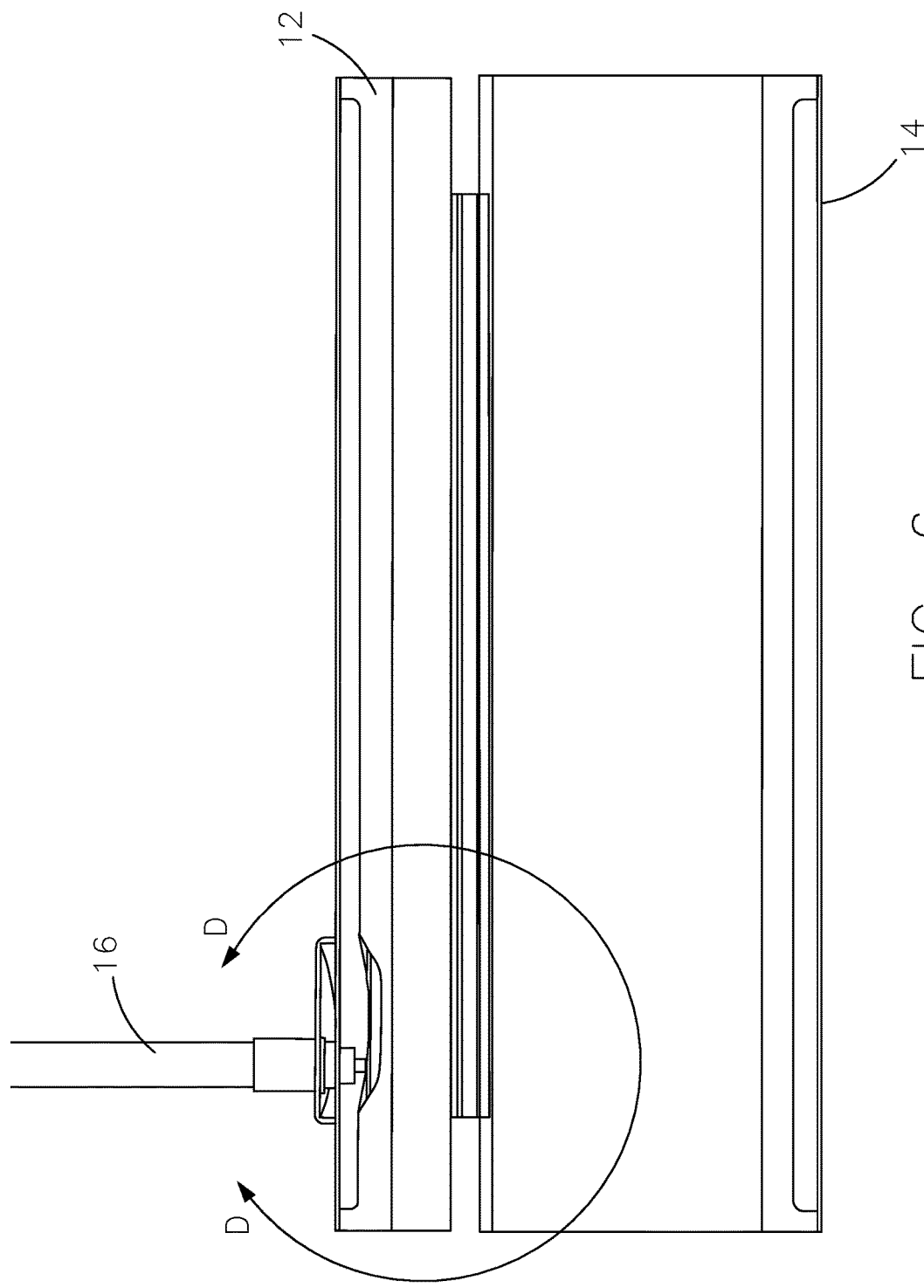
FIG. 6a is a cross-sectional view, taken along line C-C of FIG. 4, illustrating a termination area of the heater assembly and constructed in accordance with the principles of the present disclosure.
Figure 6B:
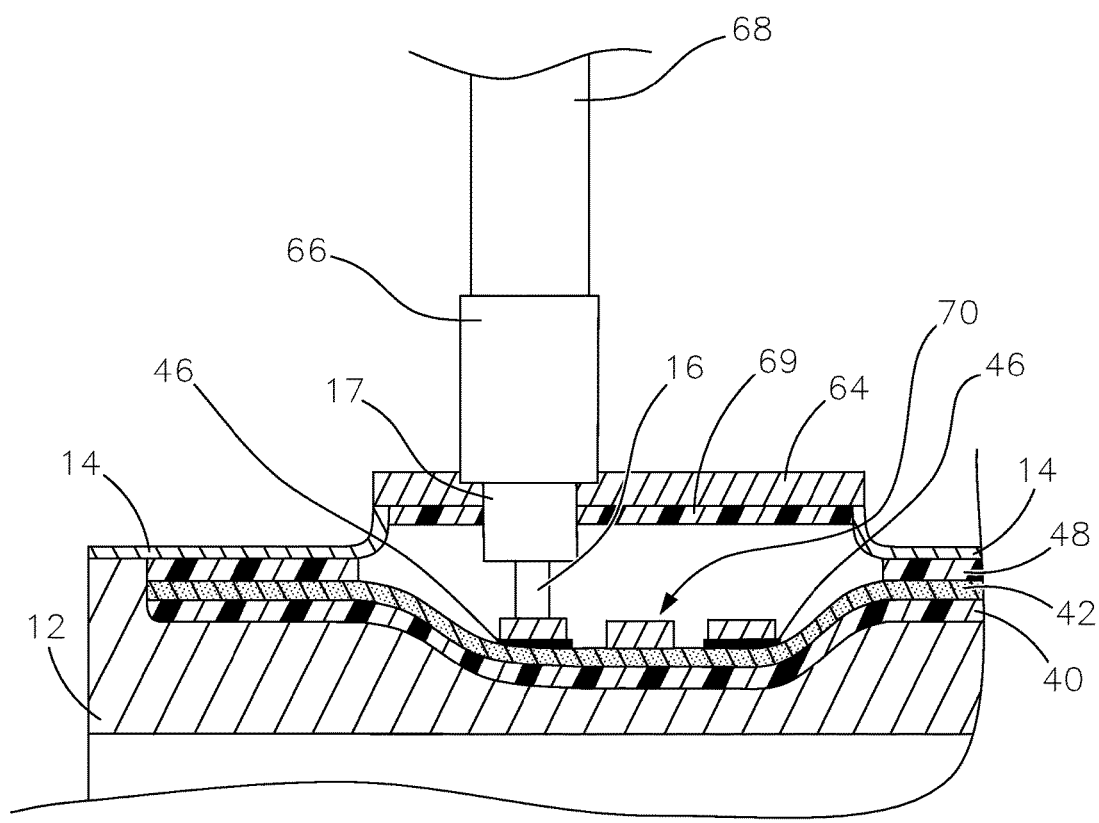
FIG. 6b is a detail view, within view D-D of FIG. 6a, illustrating the layers and terminal pads of the heater assembly and constructed in accordance with the principles of the present disclosure.

As further shown, the protective cover 14 comprises an aperture 60 formed therethrough, wherein the aperture 60 disposed proximate the terminal pads 46 as more clearly shown in FIGS. 6a and 6b, and also in FIG. 2. As such, the aperture 60 provides access for securing the lead wires 16 to the terminal pads 46, which is described in greater detail below.

Referring now to FIGS. 1-3, 6a-6b, and 11, a lead cap assembly 18 is disposed around the pair of lead wires 16 and their insulation 17 and is secured to the protective cover 14 proximate the aperture 60. In one form, the lead cap assembly 18 comprises a cap 64, a pair of cap extensions 66 that are secured to the cap 64, and a pair of sleeves 68 secured to the cap extensions 66. Additionally, an insulation disc 69 is disposed proximate the cap 64 as shown. The insulation disc 69 extends along the cap 64 between the exposed lead wires 16 and the lead cap assembly 18 and thus provides dielectric standoff between the lead wires 16 and the lead cap assembly 18. In one form, the insulation disc 69 is a Mica material, however, other materials such as Aluminum Oxide or Steatite may also be employed while remaining within the scope of the present disclosure. The lead wires 16 and their insulation 17 thus extend through the pair of sleeves 68, the cap extensions 66, the cap 64, and the insulation disc 69, which is best shown in FIG. 6b.

Figure 13:
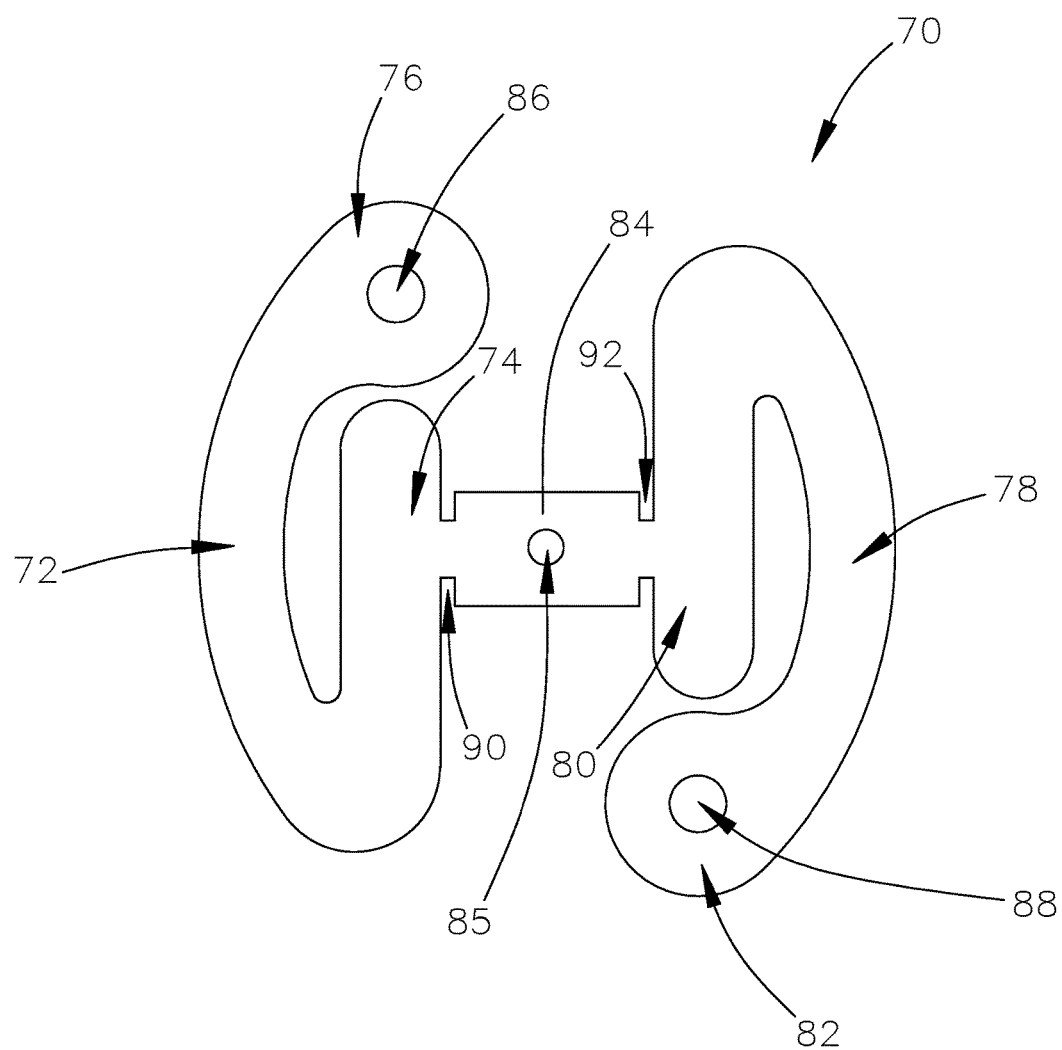
FIG. 13 is a plan view of a termination spring constructed in accordance with the principles of the present disclosure.
Figure 14:
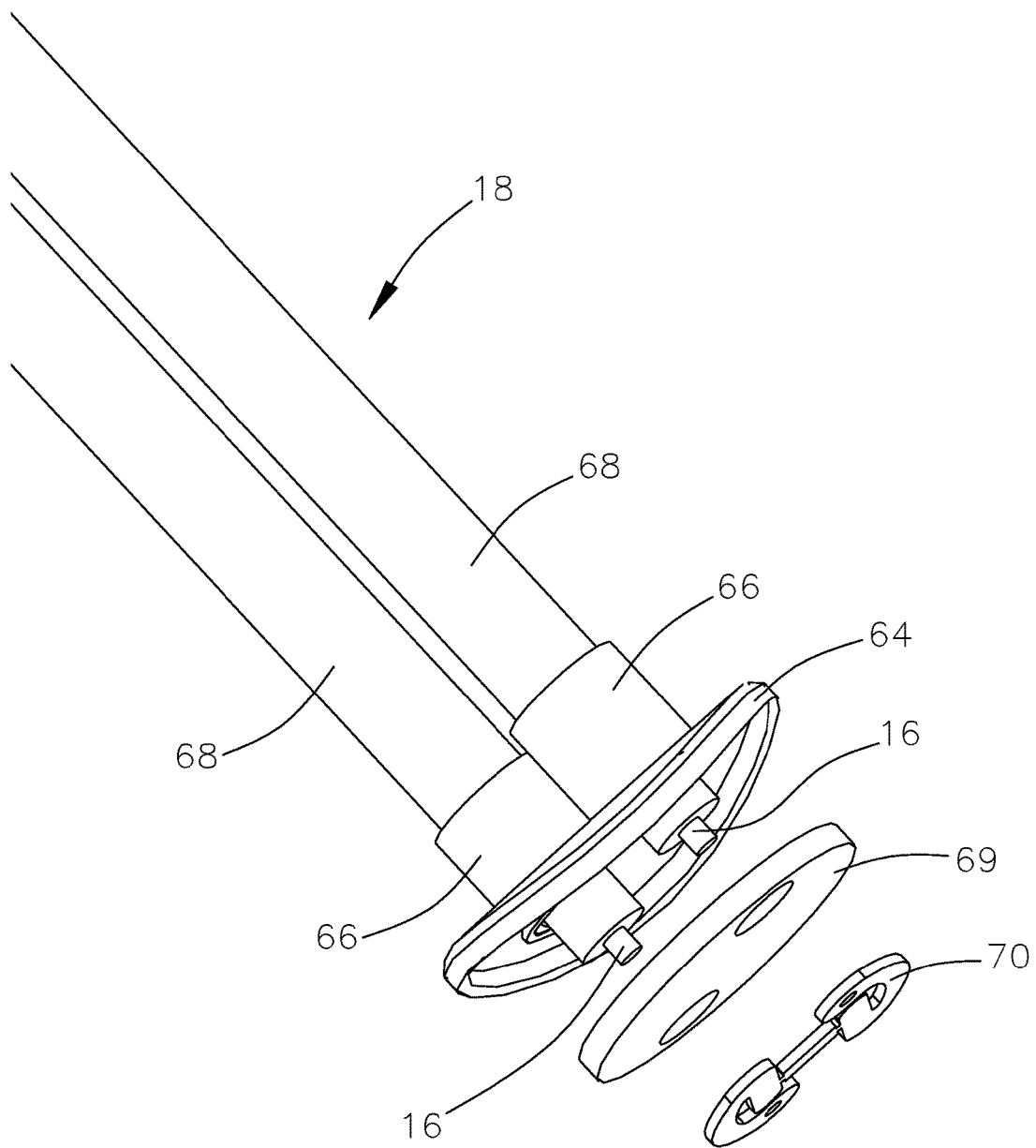
FIG. 14 is an enlarged perspective view of lead wires positioned for being secured to a termination spring and constructed in accordance with the principles of the present disclosure.

In one form of the present disclosure, the lead wires 16 are secured to the terminal pads 46 using an innovative termination spring 70, which is illustrated in FIGS. 3 and 13-14. The termination spring 70 comprises a first flexible arm 72 defining a proximal end portion 74 and a distal end portion 76, and a second flexible arm 78 disposed opposite the first flexible arm 72 and similarly defining a proximal end portion 80 and a distal end portion 82. A connecting member 84 extends between the proximal end portion 74 of the first flexible arm 72 and the proximal end portion 80 of the second flexible arm 78. Further, the distal end portion 76 of the first flexible arm 72 is disposed diagonally from the distal end portion 82 of the second flexible arm 78. In one form, the distal end portions 76 and 82 define apertures 86 and 88, respectively, through which the lead wires 16 extend and are secured. Additionally, a positioning feature 85 may be provided (illustrated as a hole in this exemplary form) in order to position the termination spring 70 within the heater assembly 10 for attachment to the terminal pads 46.

As further shown, the flexible arms 72 and 78 define an arcuate shape in one form of the present disclosure. As such, the flexible arms 72 and 78 are able to more smoothly transition load from the lead wires 16 to the terminal pads 46, which shall be more fully understood with reference to the manufacturing methods as described in greater detail below. The termination spring 70 further comprises reduced areas 90 and 92 between the connecting member 84 and the flexible arms 72 and 78. These reduced areas 90 and 92 are adapted for detachment such that the first flexible arm 72 can be separated from the second flexible arm 78 after the lead wires 16 are secured to the terminal pads 46. Preferably, the termination spring is a stainless steel material and is formed by a stamping process, however, other materials such as copper alloys, and other processes such as machining, may be employed while remaining within the scope of the present disclosure.

After the lead wires 16 are secured to the termination spring 70 through the apertures 86 and 88, the lead wires 16 are passed through the insulation disc 69 and then the lead cap assembly 18. The lead cap assembly 18 is then secured to the protective cover 14 around the aperture 60 as shown in FIGS. 1 and 2. In one form, the aperture 60 defines a raised peripheral wall 94, which provides additional space for securing the termination spring 70 and lead wires 16 to the terminal pads 46 within the heater assembly 10. Preferably, the lead cap assembly 18 is laser welded around the aperture 60, however, other methods of securing the lead cap assembly 18 may be employed while remaining within the scope of the present disclosure, provided the aperture 60 is sealed closed from the outside environment.

Figure 12B:
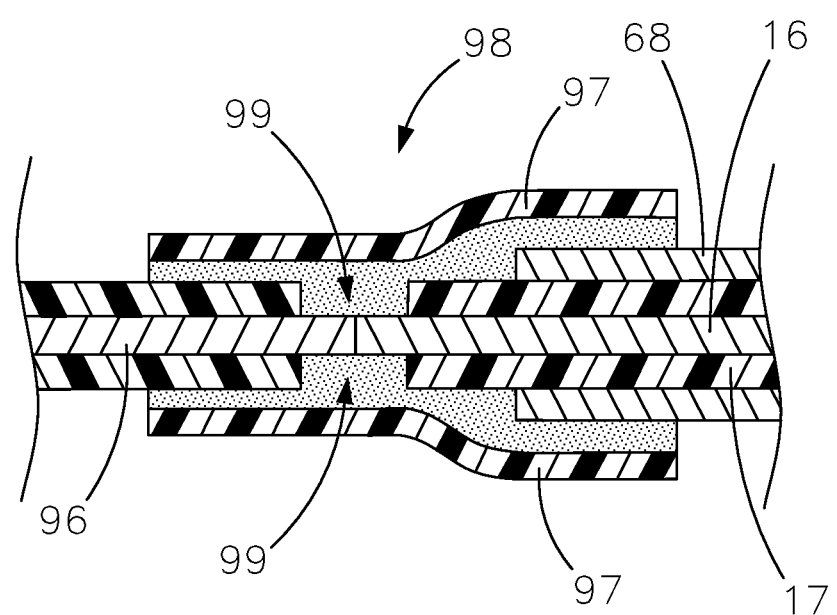
FIG. 12b is a partial cross-sectional view of a connection between lead wires using a heat shrink tube and constructed in accordance with the principles of the present disclosure.

Referring to FIGS. 12a and 12b, a secondary pair of lead wires 96 are secured to the lead wires 16 in one form of the present disclosure, wherein the secondary pair of lead wires 96 are formed of an insulating material that is not as heat resistant as the lead wires 16, (yet the lead wires 96 are moisture resistant), such as Teflon® (polytetrafluoroethylene—PTFE) by way of example. Since the secondary pair of lead wires 96 are further away from the heater assembly 10 and thus the heat source, it is not necessary for these lead wires 96 to have the same level of heat resistance as the lead wires 16 and lead cap assembly 18. However, the lead wires 16, lead cap assembly 18, and the secondary pair of lead wires 96 should be moisture resistant such that moisture is inhibited from traveling to the heater assembly 10, and more specifically the layers of the heater assembly 10 as previously illustrated and described. Accordingly, in one form, the secondary pair of lead wires 96 are secured to the lead wires 16 using a double-wall heat shrink tube 98. As best shown in FIG. 12b, the lead wires 16 and 96 are spliced together, and the heat shrink tube 98 is disposed around this interface. The heat shrink tube 98 in one form comprises a polytetrafluoroethylene (PTFE) outer wall 97 and a perfluoroalkoxy (PFA) inner wall 99. With the outer wall 97 and inner wall 99, and the heat sealing nature of the heat shrink tube 98, the connection between the lead wires 16 and the secondary lead wires 96 is advantageously resistant to moisture.

Figure 7:
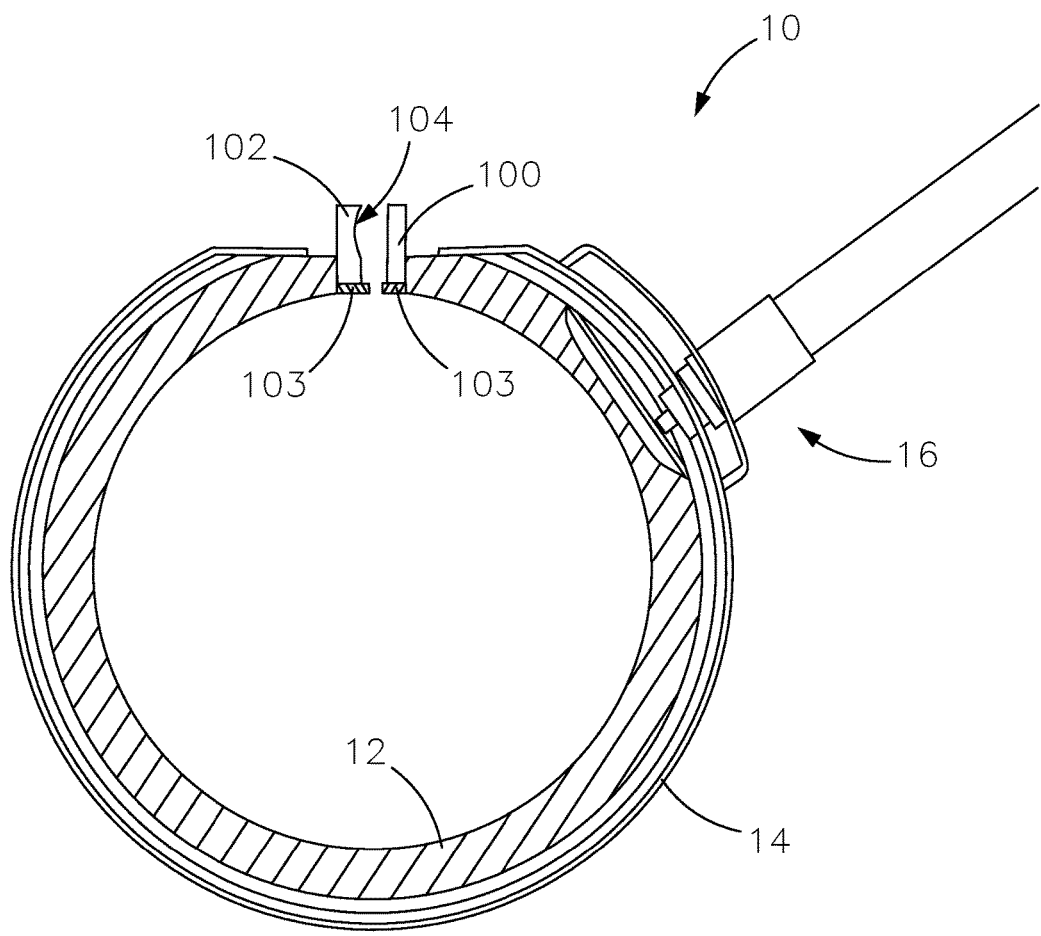
FIG. 7 is a cross-sectional view, taken along line E-E of FIG. 4, illustrating the termination area and tool supports constructed in accordance with the principles of the present disclosure.

Referring now to FIGS. 1-3 and 7, the heater assembly 10 in one form further comprises tool supports 100 and 102 disposed along the slot 28 of the substrate 12. In one form, the tool supports 100 and 102 are positioned along ledges 103 formed along the slot 28 of the substrate 12 as best shown in FIGS. 7 and 8. Generally, the tool supports 100 and 102 are provided to accommodate an installation and removal tool such that the heater assembly 10 can be spread apart for installation and removal from the target object. As shown, at least one of the tool supports 100 defines a curved wall portion 104 to confine and guide a removal tool, such that as a removal tool is rotated within the space between the tool supports 100 and 102, the heater assembly 10 may be more easily spread apart. This general concept is illustrated and described in greater detail in copending U.S. application Ser. No. 11/602,707, titled "Split-Sleeve Heater and Removal Tool," filed on Nov. 21, 2006, which is commonly assigned with the present application and the contents of which are incorporated by reference herein in their entirety. It should be understood that the heater assembly 10 may be provided with or without the tool supports 100 and 102 while still remaining within the scope of the present disclosure.

Figure 15:
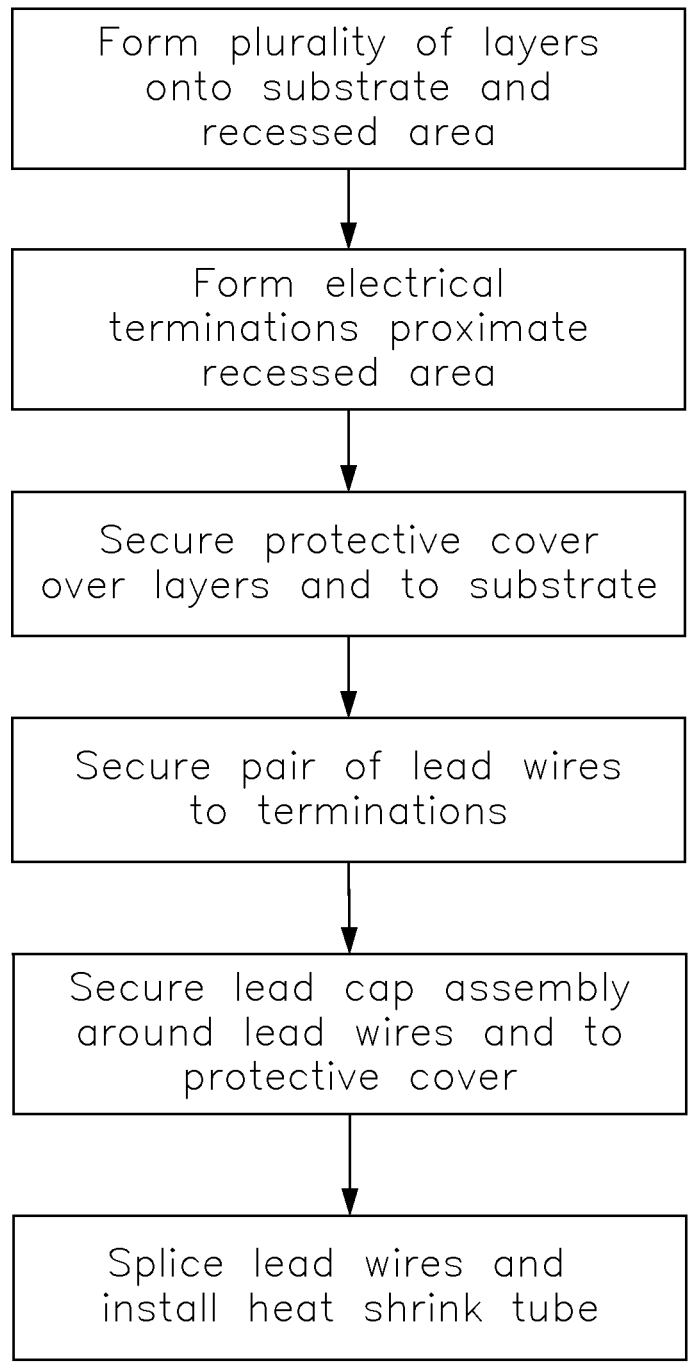
FIG. 15 is a flow diagram illustrating a method of manufacturing a heater assembly in accordance with the principles of the present disclosure.

Referring now to FIG. 15, a method of manufacturing the heater assembly 10 is now described in greater detail. First, a plurality of layers (as previously set forth) are formed onto the substrate 12 using a thermal spraying process, wherein a recessed area is formed on the layers. Next, electrical terminations (e.g., terminal pads 46) are formed proximate the recessed area, preferably using a thermal spraying process. The protective cover 14 is secured over the layers using a laser welding process, wherein edges of the protective cover 14 are welded circumferentially around raised end portions of the substrate 12 and welded longitudinally along the slot 28 of the substrate 12. The pair of lead wires 16 are then secured to the termination spring 70, preferably using a laser welding process, and then this assembly is secured to the terminal pads 46 using again, a laser welding process.

More specifically, each proximal end portion 74 and 80 of the termination spring 70 is secured to the terminal pads 46, and then the reduced areas 90 and 92 are severed. Accordingly, each of the flexible arms 72 and 78 are electrically separated. The lead wires 16 are then passed through the insulation disc 69 and the lead cap assembly 18, and the lead cap assembly 18 is secured to the protective cover 14 proximate the aperture 60, preferably by laser welding. The secondary pair of lead wires 96 are then secured to the lead wires 16 using the heat shrink tube 98 as previously set forth to complete the moisture resistant heater assembly 10.

Preferably, as shown in FIGS. 1 and 2, the sleeves 68 of the lead cap assembly 18 are oriented approximately 45 degrees relative to the longitudinal axis of the substrate 12. By orienting the sleeves 68 in this fashion, the lead wires 16 and 98 can be oriented longitudinally along the heater assembly 10 or laterally around the heater assembly 10 without each individual lead wire interfering with the other lead wire.

The present disclosure is merely exemplary in nature and, thus, variations that do not depart from the gist of the disclosure are intended to be within the scope of the invention. Such variations are not to be regarded as a departure from the spirit and scope of the invention.

What is claimed is:

1. A heater assembly comprising:
   a substrate;
   a first dielectric layer disposed over the substrate;
   a resistive element layer disposed over the first dielectric layer;
   a pair of terminal pads disposed over the first dielectric layer and in contact with the resistive element layer;
   a second dielectric layer disposed over the resistive element layer and not completely over the terminal pads;
   a preformed protective cover defining at least one aperture, the protective cover disposed over the second dielectric layer and directly secured to the substrate, wherein the aperture is disposed proximate the terminal pads;
   a pair of lead wires secured to the pair of terminal pads and
   a lead cap assembly disposed around the pair of lead wires and secured to the protective cover,
   wherein the protective cover and the lead cap assembly are secured such that the layers are protected from moisture intrusion.

2. The heater assembly according to claim 1, wherein the substrate further comprises:
   opposed end portions defining raised flanges;
   a slot extending between the opposed end portions; and
   opposed chamfered surfaces extending along the slot and across the raised flanges,
   wherein the protective cover is secured to the raised flanges and the opposed chamfered surfaces of the substrate.

3. The heater assembly according to claim 1, wherein the resistive element layer and the dielectric layers are formed by a thermal spray process.

4. The heater assembly according to claim 1 further comprising a termination spring that is secured to the lead wires, the termination spring comprising:
   a first flexible arm defining a distal end portion having an aperture through which one of the lead wires extends and is secured;

a second flexible arm disposed opposite the first flexible arm and defining a distal end portion having an aperture through which the other lead wire extends and is secured; and a connecting member that extends between the proximal end portion of the first flexible arm and the proximal end portion of the second flexible arm, the connecting member having one or more reduced areas such that the first and second flexible arms can be detached from the connecting member after the pair of lead wires are secured to the pair of terminal pads.

5. A heater assembly comprising:
a substrate;
a plurality of layers thermally sprayed onto the substrate; and
a preformed protective cover secured to the substrate,
wherein the protective cover is secured directly to the substrate such that the thermally sprayed layers are protected from moisture intrusion.

6. The heater assembly according to claim 5, wherein the layers comprise:
a first dielectric layer disposed over the substrate;
a resistive element layer disposed over the first dielectric layer; and
a second dielectric layer disposed over the resistive element layer and not completely over the terminal pads.

7. The heater assembly according to claim 6 further comprising:
a pair of terminal pads disposed over the first dielectric layer and in contact with the resistive element layer.

8. The heater assembly according to claim 7 further comprising:
a pair of lead wires secured to the pair of terminal pads; and
a lead cap assembly disposed around the pair of lead wires and secured to the protective cover,
wherein the protective cover and the lead cap assembly are secured such that the thermally sprayed layers are protected from moisture intrusion.

9. The heater assembly according to claim 8, wherein the lead cap assembly comprises:
a cap;
a pair of cap extensions secured to the cap; and
a pair of sleeves secured to the cap,
wherein the lead wires extend through the pair of sleeves, the cap extensions, and the cap.

10. The heater assembly according to claim 9, wherein the lead cap assembly further comprises an insulation disk disposed between the cap and the terminal pads.

11. The heater assembly according to claim 8 further comprising a termination spring that is secured to the lead wires, the termination spring comprising:
a first flexible arm defining a distal end portion having an aperture through which one of the lead wires extends and is secured;
a second flexible arm disposed opposite the first flexible arm and defining a distal end portion having an aperture through which the other lead wire extends and is secured; and
a connecting member that extends between the proximal end portion of the first flexible arm and the proximal end portion of the second flexible arm, the connecting member having one or more reduced areas such that the first and second flexible arms can be detached from the connecting member after the pair of lead wires are secured to the pair of terminal pads.

12. The heater assembly according to claim 8, wherein the protective cover defines an aperture proximate the terminal pads, the lead cap assembly being inserted into the aperture.

13. The heater assembly according to claim 12, further comprising a peripheral wall around the aperture for contacting the lead cap assembly.

14. The heater assembly according to claim 13, wherein the lead cap assembly is welded to the peripheral wall.

15. The heater assembly according to claim 11, wherein the termination spring includes a positioning feature for positioning the termination spring relative to the terminal pads.

16. A heater assembly comprising:
a substrate defining an outer surface and a recessed area recessed from the outer surface;
a plurality of layers thermally sprayed onto the substrate, the plurality of layers including a resistive layer and a pair of terminal pads on the resistive layer, the terminal pads being disposed in the recessed area;
a preformed protective cover directly secured to the substrate to protect the thermally sprayed layers against moisture intrusion,
wherein a space is defined between the protective cover and the recessed area of the substrate.

17. The heater assembly according to claim 16, further comprising a lead cap assembly extending through the protective layer to contact the terminal pads in the recessed area.

18. The heater assembly according to claim 17, wherein the lead cap assembly includes a cap, a pair of cap extensions secured to the cap, and a termination spring that contacts the terminal pads.

19. The heater assembly according to claim 17, wherein the pair of cap extension and the termination spring are disposed in the space.

20. The heater assembly according to claim 16, wherein the lead cap assembly is welded to the protective layer such that the thermally sprayed layers are protected from moisture intrusion.

* * * * *